United States Patent
Alkhalaf et al.

(10) Patent No.: US 11,535,787 B2
(45) Date of Patent: Dec. 27, 2022

(54) SPACER FLUIDS AND METHODS FOR CEMENTING A CASING IN A WELLBORE

(71) Applicant: Saudi Arabian Oil Company, Dhahran (SA)

(72) Inventors: Sara Abdulaziz Alkhalaf, Alkhobar (SA); Abdullah Al-Yami, Dhahran (SA); Vikrant Wagle, Abqaiq (SA); Ali Alsafran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/317,998

(22) Filed: May 12, 2021

(65) Prior Publication Data

US 2022/0363971 A1     Nov. 17, 2022

(51) Int. Cl.
| | | |
|---|---|---|
| C09K 8/40 | (2006.01) | |
| C09K 8/42 | (2006.01) | |
| E21B 33/14 | (2006.01) | |
| C09K 8/46 | (2006.01) | |

(52) U.S. Cl.
CPC ............... C09K 8/424 (2013.01); C09K 8/40 (2013.01); C09K 8/46 (2013.01); E21B 33/14 (2013.01); C09K 2208/12 (2013.01)

(58) Field of Classification Search
None
See application file for complete search history.

(56) References Cited

U.S. PATENT DOCUMENTS

| | | | |
|---|---|---|---|
| 2,761,843 A | 9/1956 | Brown | |
| 4,493,771 A | 1/1985 | Wilson et al. | |
| 4,515,708 A | 5/1985 | Haslegrave et al. | |
| 4,717,488 A | 1/1988 | Seheult et al. | |
| 5,057,467 A | 10/1991 | Croft | |
| 5,558,171 A | 9/1996 | Mcglothlin et al. | |
| 5,593,953 A | 1/1997 | Malchow, Jr. | |
| 5,641,385 A | 6/1997 | Croft et al. | |
| 5,964,295 A | 10/1999 | Brown et al. | |
| 6,153,049 A | 11/2000 | Croft | |
| 6,312,560 B1 | 11/2001 | Croft | |
| 7,863,228 B2 | 1/2011 | Loper et al. | |
| 9,434,911 B2 | 9/2016 | Bennett et al. | |
| 9,631,131 B2 | 4/2017 | Witham et al. | |
| 9,650,559 B2 | 5/2017 | Nelson | |
| 9,884,985 B2 | 2/2018 | Al-Subhi et al. | |
| 9,951,261 B2 | 4/2018 | Nelson | |
| 10,480,278 B1 | 11/2019 | Sodhi et al. | |
| 2006/0128571 A1 | 6/2006 | Loper | |
| 2008/0280786 A1* | 11/2008 | Reddy | C09K 8/035 507/104 |
| 2009/0131280 A1 | 5/2009 | Federici et al. | |
| 2010/0044040 A1* | 2/2010 | Parlar | C09K 8/40 166/276 |
| 2013/0220608 A1* | 8/2013 | Rincon-Torres | C09K 8/03 977/773 |
| 2014/0262319 A1 | 9/2014 | Treybig et al. | |
| 2014/0377013 A1* | 12/2014 | Puzrin | C09K 17/14 405/264 |
| 2015/0000918 A1* | 1/2015 | McDaniel | C09K 8/32 166/307 |
| 2015/0072902 A1 | 3/2015 | Lafitte et al. | |
| 2016/0208158 A1 | 7/2016 | Monahan et al. | |
| 2018/0127557 A1 | 5/2018 | Reddy et al. | |
| 2019/0136110 A1 | 5/2019 | Albahrani et al. | |
| 2020/0071602 A1 | 3/2020 | Dhawan et al. | |
| 2020/0115615 A1 | 4/2020 | Steves et al. | |

FOREIGN PATENT DOCUMENTS

| | | |
|---|---|---|
| WO | 2014123709 A1 | 8/2014 |
| WO | 2014200671 A2 | 12/2014 |
| WO | 2015031270 A1 | 3/2015 |

OTHER PUBLICATIONS

U.S. Office Action dated Sep. 29, 2021 pertaining to U.S. Appl. No. 17/176,434, filed Feb. 16, 2021, 21 pages.

* cited by examiner

*Primary Examiner* — Andrew Sue-Ako
(74) *Attorney, Agent, or Firm* — Dinsmore & Shohl LLP

(57) ABSTRACT

According to one or more embodiments of the present disclosure, a spacer fluid includes an aqueous fluid, a weighting agent, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 0.1 wt. % to 10 wt. % relative to the total weight of the spacer fluid. The average molecular weight of the polyethylene polyamines in the spacer fluid having the first structure may be from 200 g/mol to 400 g/mol. All of the polyethylene polyamines in the spacer fluid having the first structure may be encompassed in the clay stabilizer. Methods for cementing a casing in a wellbore using the spacer fluid are also disclosed.

21 Claims, No Drawings

SPACER FLUIDS AND METHODS FOR CEMENTING A CASING IN A WELLBORE

BACKGROUND

Field

The present disclosure relates to natural resource well drilling and, more specifically, to spacer fluids and methods for cementing a casing in a wellbore.

Technical Background

Cement slurries are commonly used in the oil and gas industries, and provide a number of important functions, such as supporting well integrity, supporting the vertical and radial loads applied to casings, and isolating portions of subterranean formations from wellbores. As a result of the significant variety of well locations, cement slurries must be able to consistently perform over a wide range of temperatures and conditions. If the cement slurries are unable to perform in a particular temperature or condition, the cement may fail and result in, for example, the loss of zonal isolation. Generally, the cement may fail in three primary locations: the cement-formation interface, in the bulk cement, and the cement-casing interface. One factor that may result in cement failure at the cement-formation interface is poor bonding between the cement and the formation. This is particularly common in subterranean formations that are composed primarily of clay particles, such as shale formations. The susceptibility of shale formations to hydration by water in cement slurries may result in the sloughing, also referred to as swelling, or disintegration of the shale formation. As a result, the cement may be unable to form a strong bond with the shale formation and the cement may fail.

SUMMARY

Accordingly, there is an ongoing need for improving the bonding between cement and shale formations. In this regard, it should be noted that spacer fluids have a significant impact on the bonding between cement and subterranean formations. Typically, spacer fluids are used in order to prevent the contamination of cement slurries by displacing wellbore fluids, as well as negative interactions between wellbore fluids, such as oil-based drilling fluids, and cement slurries. The embodiments of the present disclosure include a spacer fluid that includes a mixture of polyethylene polyamines. The chemical structure of the polyethylene polyamines may facilitate the adsorption of the polyethylene polyamines onto the surface of clay particles present in shale formations during cementing (specifically, the displacement of wellbore fluids). The adsorption of the polyethylene polyamines onto the surface of the clay particles may form a film on the surface and, as a result, reduce or prevent interactions between the clay particles and the cement slurry. This reduction or prevention of interaction may, in turn, reduce or prevent the hydration of the shale formation. As a result, the spacer fluid of the present disclosure may provide a strong bond at the cement-formation interface and reduce the potential for failure of the cement job.

According to one or more embodiments of the present disclosure, a spacer fluid includes an aqueous fluid, a weighting agent, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 0.1 weight percent (wt. %) to 10 wt. % relative to the total weight of the spacer fluid. The average molecular weight of the polyethylene polyamines in the spacer fluid having the first structure may be from 200 grams per mole (g/mol) to 400 g/mol. All of the polyethylene polyamines in the spacer fluid having the first structure may be encompassed in the clay stabilizer.

According to one or more embodiments of the present disclosure, a method for cementing a casing in a wellbore includes displacing at least a portion of a drilling fluid positioned in the wellbore with a spacer fluid. The spacer fluid may include an aqueous fluid, a weighting agent, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 0.1 wt. % to 10 wt. % relative to the total weight of the spacer fluid. The average molecular weight of the polyethylene polyamines in the spacer fluid having the first structure may be from 200 g/mol to 400 g/mol. All of the polyethylene polyamines in the spacer fluid having the first structure may be encompassed in the clay stabilizer.

Additional features and advantages of the aspects of the present disclosure will be set forth in the detailed description that follows and, in part, will be readily apparent to a person of ordinary skill in the art from the detailed description or recognized by practicing the aspects of the present disclosure.

DETAILED DESCRIPTION

The present disclosure is directed to spacer fluids and, additionally, to methods for cementing a casing in a wellbore using such spacer fluids. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon-bearing regions of the subterranean formation, production wells are drilled to a depth that enables these hydrocarbons to travel from the subterranean formation to the surface.

The portion of the production well that extends from the surface into the subterranean formation is typically referred to as a wellbore. As used in the present disclosure, the term "wellbore" may refer to the drilled hole or borehole, including the openhole or uncased portion of the production well. In order to drill a wellbore, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the wellbore. Drilling fluids may lift cuttings away from the bottom of the wellbore when recirculated back to the surface. Drilling fluids may serve a number of additional functions as well. For example, drilling fluids may also provide hydrostatic pressure in the wellbore sufficient to support the sidewalls of the wellbore. This hydrostatic pressure may prevent the sidewalls from collapsing and caving in on the drill string as well as prevent fluids present in the subterranean formation from flowing into the wellbore during drilling.

In some instances, a casing may be inserted into the wellbore. Typically, the casing is a pipe or other tubular structure that has a diameter less than that of the wellbore. Generally, the casing is lowered into the wellbore such that the bottom of the casing reaches to a region near the bottom of the wellbore. The casing may then be cemented by inserting a cement slurry into the annulus region between the outer edge of the casing and the edge of the wellbore (that is, the surface of the subterranean formation). As used in the present disclosure, the term "cement slurry" refers to a composition comprising cement particles that is mixed with at least water to form cement. The cement slurry may be inserted into the annular region by pumping the cement slurry into the interior portion of the casing, to the bottom of the casing, around the bottom of the casing, into the annular region, or combinations of these, which displaces the drilling fluid, pushing it to the top of the wellbore. Following the insertion of an appropriate amount of the cement slurry into the interior region of the casing, a displacement fluid may be utilized to push the cement slurry out of the interior region of the casing and into the annular region. This displacement may cause the drilling fluid, as well as any other fluids that may be present, to be removed from the annular region, out the top of the wellbore. The cement slurry may then be cured or otherwise allowed to harden.

However, in some instances interaction between the cement slurry and the drilling fluid should be avoided. Specifically, when an oil-based drilling fluid is used to drill the wellbore, direct contact between the cement slurry (which typically includes an aqueous fluid) and the oil-based drilling fluid can result in detrimental fluid interactions that can jeopardize not only the cementing, but also the integrity of the wellbore. The intermingling of incompatible fluids can create emulsions (both water-in-oil and oil-in-water emulsions) between the two. The emulsions, which resist fluid movement upon the application of force, raises the viscosity profile of the wellbore fluids. Increasing pumping head pressure to maintain a constant fluid circulation rate in the wellbore can result in damaging the subterranean formation as the wellbore fluid pressure exceeds the fracture gradient of the subterranean formation.

Besides detrimentally affecting the viscosity profile of wellbore fluids, when solids and water from the cement slurry transfer into the oil-based drilling fluid during emulsification, the properties of the oil-based drilling fluid are detrimentally affected. Dilution, chemical interaction, breaking of a water-in-oil emulsion and flocculation of suspended additives out of the oil phase can also occur. Cement slurry properties can also suffer from contamination by the oil-based drilling fluid. Flocculation of weighting agents and macromolecules can cause the cement to have reduced compressive strength. The diffusion of ionic species from the oil-based drilling fluid can also cause premature setting of the cement slurry. The ramifications of early cement hardening include equipment damage, time delay, wellbore damage, and possible loss of the entire tubular string. Contamination of the cement slurry with bulk oil-based drilling fluid results in increase cement slurry viscosity and fluid losses from the hardening slurry.

Accordingly, a spacer fluid may be utilized in order to prevent such interactions. Typically, spacer fluids are used in order to prevent the contamination of cement slurries by displacing wellbore fluids, as well as negative interactions between wellbore fluids, such as oil-based drilling fluids, and cement slurries. The spacer fluid may also have a significant impact on the bonding between cement and subterranean formations. As noted previously, cement may fail in three primary locations: the cement-formation interface, in the bulk cement, and the cement-casing interface. One factor that may result in cement failure at the cement-formation interface is poor bonding between the cement and the surface of the subterranean formation. This is particularly common in subterranean formations that are composed primarily of clay particles, such as shale formations. The susceptibility of shale formations to hydration by water in cement slurries may result in the sloughing, also referred to as swelling, or disintegration of the shale formation. As a result, the cement may be unable to form a strong bond with the shale formation and the cement may fail.

In one or more embodiments, the present disclosure is directed to spacer fluids that include an aqueous fluid, a weighting agent, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 0.1 weight percent (wt. %) to 10 wt. % relative to the total weight of the spacer fluid. The average molecular weight of the polyethylene polyamines in the spacer fluid having the first structure may be from 200 grams per mole (g/mol) to 400 g/mol. All of the polyethylene polyamines in the spacer fluid having the first structure may be encompassed in the clay stabilizer. The chemical structure of the polyethylene polyamines may facilitate the adsorption of the polyethylene polyamines onto the surface of clay particles present in shale formations during cementing (specifically, the displacement of wellbore fluids). The adsorption of the polyethylene polyamines onto the surface of the clay particles may form a film on the surface and, as a result, reduce or prevent interactions between the clay particles and the cement slurry. This reduction or prevention of interaction may, in turn, reduce or prevent the hydration of the shale formation. As a result, the spacer fluid of the present disclosure may provide a strong bond at the cement-formation interface and reduce the potential for failure of the cement job.

In one or more embodiments, the spacer fluid includes an aqueous fluid. As used in the present disclosure, the term "aqueous" may refer to a fluid or solution that includes water as the major constituent. In some embodiments, the aqueous fluid may include at least one of fresh water, salt water, brine, municipal water, formation water, produced water, well water, filtered water, distilled water, seawater, or combinations of these. The brine may include at least one of natural and synthetic brine, such as saturated brine or formate brine. Without being bound by any particular theory, it is believed that brine may be used to create osmotic balance between the spacer fluid and the subterranean formation.

In one or more embodiments, the aqueous fluid includes water containing organic compounds or salt. Without being bound by any particular theory, salt or other organic compounds may be incorporated into the aqueous fluid to control the density of the spacer fluid. Increasing the saturation of the aqueous fluid by increasing the salt concentration or the level of other organic compounds in the aqueous fluid may increase the density of the spacer fluid. Suitable salts include, but are not limited to, alkali metal chlorides, hydroxides, or carboxylates. For example, in embodiments the aqueous fluid may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these.

In one or more embodiments, the spacer fluid includes an aqueous fluid in an amount of from 25 wt. % to 50 wt. % relative to the total weight of the spacer fluid. For example, the spacer fluid may include an aqueous fluid in an amount of from 25 wt. % to 45 wt. %, from 25 wt. % to 40 wt. %, from 25 wt. % to 35 wt. %, from 25 wt. % to 30 wt. %, from 30 wt. % to 50 wt. %, from 30 wt. % to 45 wt. %, from 30 wt. % to 40 wt. %, from 30 wt. % to 35 wt. %, from 35 wt. % to 50 wt. %, from 35 wt. % to 45 wt. %, from 35 wt. % to 40 wt. %, from 40 wt. % to 50 wt. %, from 40 wt. % to 45 wt. %, or from 45 wt. % to 50 wt. % relative to the total weight of the spacer fluid.

In one or more embodiments, the spacer fluid includes a clay stabilizer. The clay stabilizer may consist of one or more polyethylene polyamines described herein (i.e., those having the structure $H_2NCH_2CH_2(NHCH_2CH_2)_xNH_2$ where x at least 3 as described herein). As presently described, the clay stabilizer includes all of the polyethylene polyamines in the spacer fluid having the structure $H_2NCH_2CH_2(NHCH_2CH_2)_xNH_2$ where x is at least 3. The clay stabilizer may reduce or prevent the swelling of clay particles present in subterranean formations and the hydration of subterranean formations. Without being bound by any particular theory, it is believed that the polyethylene polyamines are adsorbed onto the surfaces of the clay particles due to intermolecular interactions, such as hydrogen bonding and Van der Waals forces, between the surfaces of the clay particles and the amine moieties of the polyethylene polyamines. This adsorption may create a film or layer of polyethylene polyamines on the surfaces of the clay particles that prevents interactions between the clay particles and aqueous fluids (from either the spacer fluid or a cement slurry) that may cause swelling of the clay particles and the hydration of subterranean formations.

In one or more embodiments, the clay stabilizer may include linear polyethylene polyamines, cyclic polyethylene polyamines, branched polyethylene polyamines, or combinations of these. Generally, the polyethylene polyamines of the clay stabilizer may have the chemical structure of Formula (I):

$$H_2NCH_2CH_2(NHCH_2CH_2)_xNH_2 \quad \text{FORMULA (I)}$$

In Formula (I), x may be an integer greater than or equal to 3. In embodiments, x may be an integer greater than or equal to 4, greater than or equal to 5, greater than or equal to 6, greater than or equal to 7, greater than or equal to 8, greater than or equal to 9, greater than or equal to 10. In embodiments, x may be an integer from 3 to 10, from 3 to 9, from 3 to 8, from 3 to 7, from 3 to 6, from 3 to 5, from 3 to 4, from 4 to 10, from 4 to 9, from 4 to 8, from 4 to 7, from 4 to 6, from 4 to 5, from 5 to 10, from 5 to 9, from 5 to 8, from 5 to 7, from 5 to 6, from 6 to 10, from 6 to 9, from 6 to 8, from 6 to 7, from 7 to 10, from 7 to 9, from 7 to 8, from 8 to 10, from 8 to 9, or from 9 to 10. The $(NHCH_2CH_2)_x$ moiety of Formula (I) may include cyclic moieties, branched moieties, or combinations of these. Without being bound by any particular theory, it is believed that a greater number of $(NHCH_2CH_2)_x$ moieties may result in a greater reduction in the hydration of subterranean formations due to a greater concentration of amine moieties in the hydraulic fracturing fluid that may interact with the surface of the clay particles.

In one or more embodiments, the polyethylene polyamines of the clay stabilizer have an average molecular weight sufficient to create a film or layer on the surfaces of clay particles present in subterranean formations. In some embodiments, the polyethylene polyamines have an average molecular weight of from 200 g/mol to 400 g/mol. For example, the polyethylene polyamines may have an average molecular weight of from 200 g/mol to 375 g/mol, from 200 g/mol to 350 g/mol, from 200 g/mol to 325 g/mol, from 200 g/mol to 300 g/mol, from 200 g/mol to 275 g/mol, from 200 g/mol to 250 g/mol, from 200 g/mol to 225 g/mol, from 225 g/mol to 400 g/mol, from 225 g/mol to 375 g/mol, from 225 g/mol to 350 g/mol, from 225 g/mol to 325 g/mol, from 225 g/mol to 300 g/mol, from 225 g/mol to 275 g/mol, from 225 g/mol to 250 g/mol, from 250 g/mol to 400 g/mol, from 250 g/mol to 375 g/mol, from 250 g/mol to 350 g/mol, from 250 g/mol to 325 g/mol, from 250 g/mol to 300 g/mol, from 250 g/mol to 275 g/mol, from 275 g/mol to 400 g/mol, from 275 g/mol to 375 g/mol, from 275 g/mol to 350 g/mol, from 275 g/mol to 325 g/mol, from 275 g/mol to 300 g/mol, from 300 g/mol to 400 g/mol, from 300 g/mol to 375 g/mol, from 300 g/mol to 350 g/mol, from 300 g/mol to 325 g/mol, from 325 g/mol to 400 g/mol, from 325 g/mol to 375 g/mol, from 325 g/mol to 350 g/mol, from 350 g/mol to 400 g/mol, from 350 g/mol to 375 g/mol, or from 375 g/mol to 400 g/mol. When the polyethylene polyamines have an average molecular weight less than 200 g/mol, the polyethylene polyamines may not create a film or layer over the entire surface of clay particles present in subterranean formations. Without being bound by any particular theory, it is believed that smaller polyethylene polyamines, for example, polyethylene polyamines having an average molecular weight less than 200 g/mol, may not be large enough to adequately cover the entire surface of the clay particles. This may allow interaction between clay particles and aqueous fluids, which may result in the swelling of clay particles and the hydration of subterranean formations.

In one or more embodiments, the clay stabilizer includes tetraethlyenepentamine, pentaethylenehexamine, hexaethyleneheptamine, or combinations of these. In some embodiments, the wt. % of the tetraethlyenepentamine may be at least 10 wt. % of the clay stabilizer. For example, the amount of the tetraethlyenepentamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the amount of the pentaethylenehexamine may be at least 10 wt. % of the clay stabilizer. For example, the amount of the pentaethylenehexamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the amount of the hexaethyleneheptamine may be at least 10 wt. % of the clay stabilizer. For example, the amount of the hexaethyleneheptamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, tetraethlyenepentamine, pentaethylenehexamine, hexaethyleneheptamine, or combinations of these, may be the majority of the clay stabilizer. In embodiments, the sum of the weight percent of the tetraethlyenepentamine, pentaethylenehexamine, and hexaethyleneheptamine may be at least 50 wt. % of the clay stabilizer. For example, the sum of the weight percent of the tetraethlyenepentamine, pentaethylenehexamine, and hexaethyleneheptamine may be at least 60 wt. %, at least 70 wt. %, at least 80 wt. %, at least 90 wt. %, at least 95 wt. %, or at least 99 wt. % of the clay stabilizer.

In one or more embodiments, the spacer fluid includes the clay stabilizer in an amount sufficient to effectively reduce or prevent the hydration of subterranean formations. In some embodiments, the spacer fluid includes the clay stabilizer in an amount of from 0.1 wt. % to 10 wt. % relative to the total weight of the spacer fluid. For example, the spacer fluid may include the clay stabilizer in an amount of from 0.1 wt. % to 9 wt. %, from 0.1 wt. % to 8 wt. %, from 0.1 wt. % to 7 wt. %, from 0.1 wt. % to 6 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 1 wt. % to 10 wt. %, from 1 wt. % to 9 wt. %, from 1 wt. % to 8 wt. %, from 1 wt. % to 7 wt. %, from 1 wt. % to 6 wt. %, from 1 wt. % to 5 wt. %, from 1 wt. % to 4 wt. %, from 1 wt. % to 3 wt. %, from 1 wt. % to 2 wt. %, from 2 wt. % to 10 wt. %, from 2 wt. % to 9 wt. %, from 2 wt. % to 8 wt. %, from 2 wt. % to 7 wt. %, from 2 wt. % to 6 wt. %, from 2 wt. % to 5 wt. %, from 2 wt. % to 4 wt. %, from 2 wt. % to 3 wt. %, from 3 wt. % to 10 wt. %, from 3 wt. % to 9 wt. %, from 3 wt. % to 8 wt. %, from 3 wt. % to 7 wt. %, from 3 wt. % to 6 wt. %, from 3 wt. % to 5 wt. %, from 3 wt. % to 4 wt. %, from 4 wt. % to 10 wt. %, from 4 wt. % to 9 wt. %, from 4 wt. % to 8 wt. %, from 4 wt. % to 7 wt. %, from 4 wt. % to 6 wt. %, from 4 wt. % to 5 wt. %, from 5 wt. % to 10 wt. %, from 5 wt. % to 9 wt. %, from 5 wt. % to 8 wt. %, from 5 wt. % to 7 wt. %, from 5 wt. % to 6 wt. %, from 6 wt. % to 10 wt. %, from 6 wt. % to 9 wt. %, from 6 wt. % to 8 wt. %, from 6 wt. % to 7 wt. %, from 7 wt. % to 10 wt. %, from 7 wt. % to 9 wt. %, from 7 wt. % to 8 wt. %, from 8 wt. % to 10 wt. %, from 8 wt. % to 9 wt. %, or from 9 wt. % to 10 wt. % relative to the total weight of the spacer fluid.

In one or more embodiments, the spacer fluid includes a weighting agent. Weighting agents may include finely divided solid particles that may be dispersed in the spacer fluid. Weighting agents may increase the density of the spacer fluid to support the sidewalls of the wellbore. Weighting agents may also increase the hydrostatic pressure of the spacer fluid to reduce or prevent fluids present in the subterranean formation from flowing into the wellbore. In some embodiments, the weighting agent may include barite, hematite, calcium carbonate, siderite, ilmenite, or combinations of these. In one or more embodiments, the spacer fluid includes a weighting agent in an amount of from 25 wt. % to 75 wt. % relative to the total weight of the spacer fluid. For example, the spacer fluid may include a weighting agent in an amount of from 25 wt. % to 65 wt. %, from 25 wt. % to 55 wt. %, from 25 wt. % to 45 wt. %, from 25 wt. % to 35 wt. %, from 35 wt. % to 75 wt. %, from 35 wt. % to 65 wt. %, from 35 wt. % to 55 wt. %, from 35 wt. % to 45 wt. %, from 45 wt. % to 75 wt. %, from 45 wt. % to 65 wt. %, from 45 wt. % to 55 wt. %, from 55 wt. % to 75 wt. %, from 55 wt. % to 65 wt. %, or from 65 wt. % to 75 wt. % relative to the total weight of the spacer fluid.

In one or more embodiments, the spacer fluid includes a mutual solvent. As used in the present application, the term "mutual solvent" refers to a material that is soluble in both aqueous and non-aqueous fluids. Mutual solvents may provide a number of functions, such as removing hydrocarbon deposits, controlling the wettability of surfaces, and preventing or breaking emulsions. A suitable mutual solvent may include, for example, ethylene glycol monobutyl ether. As noted previously, the spacer fluid may be in contact with both an OBM and a cement slurry that includes an aqueous fluid. Accordingly, in some embodiments, the spacer fluid should be compatible with both aqueous and non-aqueous fluids in order to prevent negative effects. This may be accomplished, in some embodiments, by the inclusion of the mutual solvent. For example, when included in the spacer fluid, the mutual solvent may prevent the formation of emulsions (both water-in-oil and oil-in-water emulsions) at the interfaces between the spacer fluid, the OBM, and the cement slurry, which can negatively affect the viscosity profile of the wellbore fluids, as noted previously.

In one or more embodiments, the spacer fluid includes the mutual solvent in an amount sufficient to ensure the spacer fluid is compatible with both aqueous-based and non-aqueous-based fluids, such as cement slurries and OBMs, respectively. In some embodiments, the spacer fluid includes the mutual solvent in an amount of from 0.1 wt. % to 10 wt. % relative to the total weight of the spacer fluid. For example, the spacer fluid may include the mutual solvent in an amount of from 0.1 wt. % to 9 wt. %, from 0.1 wt. % to 8 wt. %, from 0.1 wt. % to 7 wt. %, from 0.1 wt. % to 6 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 1 wt. % to 10 wt. %, from 1 wt. % to 9 wt. %, from 1 wt. % to 8 wt. %, from 1 wt. % to 7 wt. %, from 1 wt. % to 6 wt. %, from 1 wt. % to 5 wt. %, from 1 wt. % to 4 wt. %, from 1 wt. % to 3 wt. %, from 1 wt. % to 2 wt. %, from 2 wt. % to 10 wt. %, from 2 wt. % to 9 wt. %, from 2 wt. % to 8 wt. %, from 2 wt. % to 7 wt. %, from 2 wt. % to 6 wt. %, from 2 wt. % to 5 wt. %, from 2 wt. % to 4 wt. %, from 2 wt. % to 3 wt. %, from 3 wt. % to 10 wt. %, from 3 wt. % to 9 wt. %, from 3 wt. % to 8 wt. %, from 3 wt. % to 7 wt. %, from 3 wt. % to 6 wt. %, from 3 wt. % to 5 wt. %, from 3 wt. % to 4 wt. %, from 4 wt. % to 10 wt. %, from 4 wt. % to 9 wt. %, from 4 wt. % to 8 wt. %, from 4 wt. % to 7 wt. %, from 4 wt. % to 6 wt. %, from 4 wt. % to 5 wt. %, from 5 wt. % to 10 wt. %, from 5 wt. % to 9 wt. %, from 5 wt. % to 8 wt. %, from 5 wt. % to 7 wt. %, from 5 wt. % to 6 wt. %, from 6 wt. % to 10 wt. %, from 6 wt. % to 9 wt. %, from 6 wt. % to 8 wt. %, from 6 wt. % to 7 wt. %, from 7 wt. % to 10 wt. %, from 7 wt. % to 9 wt. %, from 7 wt. % to 8 wt. %, from 8 wt. % to 10 wt. %, from 8 wt. % to 9 wt. %, or from 9 wt. % to 10 wt. % relative to the total weight of the spacer fluid.

In one or more embodiments, the spacer fluid includes a surfactant. As used in the present disclosure, the term "surfactant" refers to materials that reduce the surface tension of the spacer fluid. In some embodiments, the surfactant improves the ability of the spacer fluid to remove wellbore fluids, such as OBMS, from the surfaces of the wellbore. The removal of wellbore fluids may ensure that the surfaces of the wellbore are water wet and, as a result, improve the bonding of cements. In one or more embodiments, the spacer fluid includes a surfactant in an amount of from 0.01 wt. % to 5 wt. % relative to the total weight of the spacer fluid. For example, the spacer fluid may include a surfactant in an amount of from 0.01 wt. % to 2.5 wt. %, from 0.01 wt. % to 1 wt. %, from 0.01 wt. % to 0.5 wt. %, from 0.01 wt. % to 0.1 wt. %, from 0.1 wt. % to 5 wt. %, from 0.1 wt. % to 2.5 wt. %, from 0.1 wt. % to 1 wt. %, from 0.1 wt. % to 0.5 wt. %, from 0.5 wt. % to 5 wt. %, from 0.5 wt. % to 2.5 wt. %, from 0.5 wt. % to 1 wt. %, from 1 wt. % to 5 wt. %, from 1 wt. % to 2.5 wt. %, or from 2.5 wt. % to 5 wt. % relative to the total weight of the spacer fluid.

In one or more embodiments, the spacer fluid includes a defoamer. As used in the present disclosure, the term "defoamer" refers to materials that reduce the interfacial tension of the spacer fluid. Defoamers may allow gas trapped in the spacer fluid to readily escape and, as a result, prevent the formation of a foam. In one or more embodiments, the spacer fluid includes a defoamer in an amount of from 0.01 wt. % to 5 wt. % relative to the total weight of the spacer fluid. For example, the spacer fluid may include a defoamer in an amount of from 0.01 wt. % to 2.5 wt. %, from 0.01 wt. % to 1 wt. %, from 0.01 wt. % to 0.5 wt. %, from 0.01 wt. % to 0.1 wt. %, from 0.1 wt. % to 5 wt. %, from 0.1 wt. % to 2.5 wt. %, from 0.1 wt. % to 1 wt. %, from 0.1 wt. % to 0.5 wt. %, from 0.5 wt. % to 5 wt. %, from 0.5 wt. % to 2.5 wt. %, from 0.5 wt. % to 1 wt. %, from 1 wt. % to 5 wt. %, from 1 wt. % to 2.5 wt. %, or from 2.5 wt. % to 5 wt. % relative to the total weight of the spacer fluid.

In one or more embodiments, the spacer fluid may be formulated to have specific characteristics, such as increased viscosity and density. For example, the spacer fluid may be formulated to have a density in a range suitable to provide the necessary hydrostatic pressure to support the sidewalls of the wellbore and prevent fluids in the formation from flowing into the wellbore. Additionally, the spacer fluid may be formulated to have viscosity in a range suitable to allow the spacer fluid to be pumped down through the wellbore. To accomplish these functions, the spacer fluid may include one or more additives that are suitable for use in spacer fluids, such as gelling agents. As noted previously, the spacer fluid may be compatible with both aqueous-based and non-aqueous-based fluids. As a result, the spacer fluid may have a composition different than other wellbore fluids, such as an OBM already present in the wellbore. For example, the spacer fluid may be substantially free of materials typically found in OBMS, such as XC polymer (xanthan gum), starch, NaCl, NaOH, and $CaCO_3$. As used in the present disclosure, the term "substantially free" of a material means the spacer fluid includes less than 1.0 wt. % of the material. For example, the spacer fluid, which may be substantially free of XC polymer, may include less than 1.0 wt. % XC polymer, such as less than 0.8 wt. % XC polymer, less than 0.6 wt. % XC polymer, less than 0.4 wt. % XC polymer, or less than 0.2 wt. % XC polymer.

The present disclosure is also directed to the use of the spacer fluid in methods for cementing a casing in a wellbore. In one or more embodiments, cementing occurs after drilling in order to secure a portion of a fluid conduit between the wellbore interior and the surface to the wellbore wall of the wellbore. Accordingly, the wellbore fluids will include drilling fluids before cementing occurs. In one or more embodiments, a method for cementing a casing in a wellbore includes displacing at least a portion of a drilling fluid positioned in the wellbore with a spacer fluid. The spacer fluid may be any of the embodiments described previously in the present disclosure. In some embodiments, the method also includes displacing the spacer fluid with a cement slurry. In some embodiments, the spacer fluid is pumped into a first conduit defined by an interior wall of a tubular in the wellbore, the cement slurry is pumped into the first conduit, and at least a portion of the drilling fluid exits the well bore through a second conduit defined by an exterior wall of the tubular and a wall of the wellbore

EXAMPLES

The various embodiments of the present disclosure will be further clarified by the following examples. The examples are illustrative in nature, and should not be understood to limit the embodiments of the present disclosure.

Example 1

In Example 1, the effect the clay stabilizer has on the setting of cement was observed. Specifically, three cement slurry samples were prepared: Example 1, which included 355.04 grams of water, 7.22 grams of a clay stabilizer, 800 grams of Class G Portland cement particles, and a few drops of a defoamer (commercially available as DF-3 from TAQA); Example 2, which included 355.04 grams of water, 15 grams of the clay stabilizer, 800 grams of Class G Portland cement particles, and a few drops of the defoamer; and Comparative Example 1, which included 355.04 grams of water, 800 grams of Class G Portland cement particles, and a few drops of the defoamer. The clay stabilizer was a mixture of polyethylene polyamines commercially available as ETHYLENEAMINE E-100 from Huntsman. ETHYLENEAMINE E-100 is a mixture of polyethylene polyamines having an average molecular weight of 250 g/mol to 300 g/mol. Each sample was then allowed to cure at a constant temperature of 150 degrees Fahrenheit (° F.) and pressure of 1,389 pounds per square inch (psi). The samples were considered to be fully cured once they achieved a consistency of 100 Bearden units (Bc). The curing time of each sample, as well as the rheology of each sample, is reported in Table 1.

The rheological properties of the samples were determined by measuring the shear stress on the samples at different shear rates. The rheology of the samples may be characterized by the plastic viscosity (PV) and the yield point (YP), which are parameters from the Bingham plastic rheology model. The plastic viscosity is related to the resistance of a material to flow due to mechanical interaction between solids, such as fines, in the material. The plastic viscosity represents the viscosity of the material extrapolated to infinite shear rate. The plastic viscosity is expressed in centipoise (cP). The plastic viscosity reflects the type and concentration of the solids in the material. The plastic viscosity of a material may be estimated by measuring the shear stress of the material using a rheometer at spindle speeds of 300 rotations per minute (rpm) and 600 rpm and subtracting the 300 rpm dial reading from the 600 rpm dial reading according to Equation (I):

$$PV\ (cP) = (\text{Dial Reading at 600 } rpm) - (\text{Dial Reading at 300 } rpm) \quad \text{Equation (I)}$$

Materials may behave as a rigid body when the shear stress is less than the yield point, and materials may flow as a viscous fluid when the shear stress is greater than the yield point. In other words, the yield point represents the amount of stress required to move the material from a static condition. The yield point of a material is expressed as a force per area, such as pounds per one hundred square feet (lbf/100 $ft^2$). The yield point of a material is determined by extrapolating the Bingham plastic rheology model to a shear rate of zero. The yield point of a material may be estimated from the plastic viscosity of the material according to Equation (II):

$$YP = (\text{Dial Reading at 300 } rpm) - PV \quad \text{Equation (II)}$$

The gel strength of a material refers to the shear stress of the material measured at a shear rate less than 10 rpm following a defined period of time during which the material is maintained in a static state.

TABLE 1

| | Rheology (120° F.) | | |
|---|---|---|---|
| | Example 1 | Example 2 | Comparative Example 1 |
| Curing Time (minutes) | 136 | 128 | 110 |
| 600 rpm | 155 | — | 142 |
| 300 rpm | 115 | — | 119 |
| 200 rpm | 98 | — | 86 |

TABLE 1-continued

| Rheology (120° F.) | | | |
|---|---|---|---|
| | Example 1 | Example 2 | Comparative Example 1 |
| 100 rpm | 76 | — | 70 |
| 6 rpm | 22 | — | 16 |
| 3 rpm | 18 | — | 10 |
| PV (cP) | 40 | — | 23 |
| YP (lb/100ft$^2$) | 75 | — | 96 |
| 10-Second Gel Strength (lb/100ft$^2$) | 19 | — | 17 |
| 10-Minute Gel Strength (lb/100ft$^2$) | 50 | — | 16 |

As shown by Table 1, the clay stabilizer did not negatively effect (that is, reduce) the curing time of the cement. Indeed, the clay stabilizer slightly increased the curing time of the cement. In contrast, conventional clay stabilizers, such as KCl, are known to accelerate curing time of cement. This accelerated curing time can result in premature curing and failure of the cementing job.

Example 2

In Example 2, a dispersion recovery test was performed. First, two spacer fluid samples were prepared: Example 3 that included 20 grams of ETHYLENEAMINE E-100, and Comparative Example 2 that included 19 grams of KCl. Both samples (350 mL) were then mixed with shale cuttings (20 g). After mixing, the samples were both hot rolled at 66° C. and 25 rpm for 16 hours. After hot rolling, the shale cuttings were sieved from the samples using No. 35 mesh and then washed thoroughly to remove any small shale particles. The shale cuttings remaining on the sieve were then desiccated at 105° C. for 24 hours before being weighed. The recovery was then calculated using the following equation:

$$\text{Shale Dispersion Recovery} = W_c / 20 \times 100 \qquad \text{Equation (III)}$$

Where $W_c$ is the weight of the shale cuttings remaining on the sieve after desiccation. The results are reported in Table 2.

TABLE 2

| | Example 3 | Comparative Example 2 |
|---|---|---|
| Composition | | |
| Water (g) | 379.3 | 379.3 |
| Defoamer (g; commercially available as DF-3 from TAQA) | 4.3 | 4.3 |

TABLE 2-continued

| | Example 3 | Comparative Example 2 |
|---|---|---|
| ETHYLENEANIINE E-100 (g) | 20 | — |
| KCl (g) | — | 19 |
| Gelling Agent (g; commercially available as WG-1 from TAQA) | 2.9 | 2.9 |
| Barite (g) | 604.7 | 604.7 |
| Surfactant (g; commercially available as WW-2000 from TAQA) | 26.8 | 26.8 |
| Mutual Surfactant (g; commercially available as MS-1 from TAQA) | 38.5 | 38.5 |
| Shale Dispersion Recovery | | |
| Initial Weight of Shale (g) | 20 | 20 |
| Initial Recovery Weight (g) | 22.88 | 21.41 |
| Weight After Drying (g) | 18.52 | 16.94 |
| % | 92.6 | 84.7 |

Example 3

To observe the effects of the presently disclosed hydraulic fracturing fluid in reducing or preventing the hydration of shale formations, a hydration suppression test was performed using bentonite clay. As bentonite clay is susceptible to swelling, similar to the clay particles present in a shale formation, the volume of bentonite clay will increase when exposed to a hydraulic fracturing fluid and, as a result, the viscosity of the hydraulic fracturing fluid will increase. Therefore, as stated previously, the ability of a hydraulic fracturing fluid to reduce or prevent the hydration of a subterranean formation may be measured by the rheology of the hydraulic fracturing fluid after exposure to bentonite clay.

In this regard, four different hydraulic fracturing fluid samples were prepared. The first sample (Comparative Example 3) included only 350 grams of water. Examples 4-6 were each prepared by first mixing 350 grams of water with 1 grams of ETHYLENEAMINE E-100, 5 grams of ETHYLENEAMINE E-100, and 10 grams of ETHYLENEAMINE E-100, respectively, for 5 minutes. Each sample was then mixed with 30 grams of bentonite for 20 minutes. After mixing, the samples were each hot rolled at 150° F. for 16 hours. After hot rolling, the rheology of each sample was measured twice, once at room temperature (RT) and once at 120° F., using a viscometer (commercially available as Model 35 from Fann Instrument Company). The composition and rheology of each sample are listed in Table 3.

TABLE 3

| | Comparative Example 3 | | Example 4 | | Example 5 | | Example 6 | |
|---|---|---|---|---|---|---|---|---|
| Composition | | | | | | | | |
| Water (g) | 350 | | 350 | | 350 | | 350 | |
| ETHYLENEAMINE E-100 (g) | — | | 1 | | 5 | | 10 | |
| Bentonite (g) | 30 | | 30 | | 30 | | 30 | |
| Rheology | | | | | | | | |
| | RT | 120° F. | RT | 120° F. | RT | 120° F. | RT | 120° F. |
| 600 rpm | 112 | 95 | 31 | 24 | 22 | 17 | 20 | 15 |
| 300 rpm | 73 | 67 | 20 | 16 | 12 | 9 | 12 | 10 |
| 200 rpm | 62 | 54 | 15 | 13 | 8 | 7 | 9 | 8 |

| | | | | | | | |
|---|---|---|---|---|---|---|---|
| 100 rpm | 44 | 34 | 11 | 9 | 4 | 4 | 7 | 6 |
| 6 rpm | 14 | 12 | 6 | 4 | 3 | 2 | 5 | 4 |
| 3 rpm | 11 | 10 | 4 | 3 | 2 | 1 | 4 | 4 |
| PV (cP) | 39 | 28 | 11 | 8 | 10 | 8 | 8 | 5 |
| YP (lbf/100ft$^2$) | 34 | 39 | 9 | 8 | 2 | 1 | 4 | 5 |
| 10-Second Gel Strength (lbf/100ft$^2$) | 13 | 13 | 8 | 4 | 4 | 3 | 5 | 4 |
| 10-Minute Gel Strength (lbf/100ft$^2$) | 41 | 44 | 12 | 5 | 7 | 7 | 10 | 9 |

As shown by Table 3, hydraulic fracturing fluids that include the clay stabilizer are capable of maintaining a lesser plastic viscosity, yield point, 10-second gel strength, and 10-minute gel strength when compared to a sample that does not include the clay stabilizer. This indicates that the spacer fluid of the present disclosure may be capable of reducing or preventing the hydration of subterranean formations. In particular, the clay stabilizer prevented the bentonite clay from swelling when in contact with the spacer fluid and, as a result, prevented an increase in rheological properties, such as plastic viscosity, of the spacer fluid.

Example 4

To compare the effects of different mixtures of polyethylene polyamines, a hydration suppression test was performed using bentonite clay, as detailed in Example 3. Examples 7 and 8 were each prepared by first mixing 350 grams of water with 1 gram of tetraethylenepentamine (commercially available from Huntsman Corporation) and 5 grams of tetraethylenepentamine, respectively, for 5 minutes. After mixing, Examples 7 and 8 were each hot rolled at 150° F. for 16 hours. After hot rolling, the rheology of both Examples 7 and 8 was measured twice, once at room temperature (RT) and once at 120° F., using a viscometer (commercially available as Model 35 from Fann Instrument Company). The composition and rheology of both Examples 7 and 8, as well as Examples 4-6 of Example 2 are listed in Table 4.

weight of 250 g/mol to 300 g/mol are capable of maintaining a similar or lesser plastic viscosity, yield point, 10-second gel strength, and 10-minute gel strength when compared to a sample that included only tetraethylenepentamine. This indicates that samples that include mixtures of polyethylene polyamines having a greater average molecular weight when compared to other mixtures of polyethylene polyamines are capable of a greater reduction of the hydration of subterranean formations.

It will be apparent to persons of ordinary skill in the art that various modifications and variations can be made without departing from the scope of the present disclosure. Since modifications, combinations, sub-combinations, and variations of the disclosed embodiments, which incorporate the spirit and substance of the present disclosure, may occur to persons of ordinary skill in the art, the scope of the present disclosure should be construed to include everything within the scope of the appended claims and their equivalents.

The present disclosure includes several aspects. A first aspect includes a spacer fluid comprising: an aqueous fluid; a weighting agent; and a clay stabilizer consisting of one or more polyethylene polyamines having a first structure $H_2NCH_2CH_2(NHCH_2CH_2)_xNH_2$, where x is an integer greater than or equal to 3, wherein: the amount of the clay stabilizer is from 0.1 wt. % to 10 wt. % relative to the total weight of the spacer fluid; the average molecular weight of the polyethylene polyamines in the spacer fluid having the first structure is from 200 g/mol to 400 g/mol; and all of the

TABLE 4

| | Example 4 | | Example 5 | | Example 6 | | Example 7 | | Example 8 | |
|---|---|---|---|---|---|---|---|---|---|---|
| Composition | | | | | | | | | | |
| Water (g) | 350 | | 350 | | 350 | | 350 | | 350 | |
| ETHYLENEAMINE E-100 (g) | 1 | | 5 | | 10 | | — | | — | |
| Tetraethylenepentamine (g) | — | | — | | — | | 1 | | 5 | |
| Bentonite (g) | 30 | | 30 | | 30 | | 30 | | 30 | |
| Rheology | | | | | | | | | | |
| | RT | 120° F. | RT | 120° F. | RT | 120° F. | RT | 120° F. | RT | 120° F. |
| 600 rpm | 31 | 24 | 22 | 17 | 20 | 15 | 34 | 30 | 33 | 29 |
| 300 rpm | 20 | 16 | 12 | 9 | 12 | 10 | 23 | 20 | 18 | 18 |
| 200 rpm | 15 | 13 | 8 | 7 | 9 | 8 | 19 | 15 | 14 | 15 |
| 100 rpm | 11 | 9 | 4 | 4 | 7 | 6 | 14 | 10 | 9 | 11 |
| 6 rpm | 6 | 4 | 3 | 2 | 5 | 4 | 8 | 4 | 3 | 5 |
| 3 rpm | 4 | 3 | 2 | 1 | 4 | 4 | 6 | 2 | 3 | 4 |
| PV | 11 | 8 | 10 | 8 | 8 | 5 | 11 | 10 | 15 | 11 |
| YP | 9 | 8 | 2 | 1 | 4 | 5 | 12 | 10 | 3 | 7 |
| Gel Strength, 10 sec | 8 | 4 | 4 | 3 | 5 | 4 | 6 | 5 | 6 | 7 |
| Gel Strength, 10 min | 12 | 5 | 7 | 7 | 10 | 9 | 6 | 5 | 20 | 40 |

As shown by Table 4, samples that include a mixture of polyethylene polyamines having an average molecular polyethylene polyamines in the spacer fluid having the first structure are encompassed in the clay stabilizer.

A second aspect may include the first aspect, wherein the spacer fluid comprises the aqueous fluid in an amount of from 25 wt. % to 50 wt. % relative to the total weight of the spacer fluid.

A third aspect may include any of the previous aspects, wherein the spacer fluid comprises the weighting agent in an amount of from 25 wt. % to 75 wt. % relative to the total weight of the spacer fluid.

A fourth aspect may include any of the previous aspects, wherein the polyethylene polyamines comprise linear polyethylene polyamines, cyclic polyethylene polyamines, branched polyethylene polyamines, or combinations of these.

A fifth aspect may include any of the previous aspects, wherein the polyethylene polyamines comprise tetraethylenepentamine, pentaethylenehexamine, hexaethyleneheptamine, or combinations of these.

A sixth aspect may include any of the previous aspects, wherein the sum of the weight percent of the tetraethylenepentamine, pentaethylenehexamine, and hexaethyleneheptamine is at least 50 wt. % of the polyethylene polyamines of the mixture.

A seventh aspect may include any of the previous aspects, wherein the spacer fluid further comprises a mutual solvent in an amount of from 0.1 wt. % to 10 wt. % relative to the total weight of the spacer fluid.

An eighth aspect may include any of the previous aspects, wherein the spacer fluid further comprises a surfactant in an amount of from 0.01 wt. % to 5 wt. % relative to the total weight of the spacer fluid.

A ninth aspect may include any of the previous aspects, wherein the spacer fluid further comprises a defoamer in an amount of from 0.01 wt. % to 5 wt. % relative to the total weight of the spacer fluid.

A tenth aspect may include a method for cementing a casing in a wellbore, the method comprising displacing at least a portion of a drilling fluid positioned in the wellbore with a spacer fluid comprising: an aqueous fluid; a weighting agent; and a clay stabilizer consisting of one or more polyethylene polyamines having a first structure $H_2NCH_2CH_2(NHCH_2CH_2)_xNH_2$, where x is an integer greater than or equal to 3, wherein: the amount of the clay stabilizer is from 0.1 wt. % to 10 wt. % relative to the total weight of the spacer fluid; the average molecular weight of the polyethylene polyamines in the spacer fluid having the first structure is from 200 g/mol to 400 g/mol; and all of the polyethylene polyamines in the spacer fluid having the first structure are encompassed in the clay stabilizer.

An eleventh aspect may include any of the previous aspects, wherein the method further comprises displacing the spacer fluid with a cement slurry.

A twelfth aspect may include any of the previous aspects, wherein: the spacer fluid is pumped into a first conduit defined by an interior wall of a tubular in the wellbore; the cement slurry is pumped into the first conduit; and at least a portion of the drilling fluid exits the well bore through a second conduit defined by an exterior wall of the tubular and a wall of the wellbore.

A thirteenth aspect may include any of the previous aspects, wherein the spacer fluid comprises the aqueous fluid in an amount of from 25 wt. % to 50 wt. % relative to the total weight of the spacer fluid.

A fourteenth aspect may include any of the previous aspects, wherein the spacer fluid comprises the weighting agent in an amount of from 25 wt. % to 75 wt. % relative to the total weight of the spacer fluid.

A fifteenth aspect may include any of the previous aspects, wherein the polyethylene polyamines comprise linear polyethylene polyamines, cyclic polyethylene polyamines, branched polyethylene polyamines, or combinations of these.

A sixteenth aspect may include any of the previous aspects, wherein the polyethylene polyamines comprise tetraethylenepentamine, pentaethylenehexamine, hexaethyleneheptamine, or combinations of these.

A seventeenth aspect may include any of the previous aspects, wherein the sum of the weight percent of the tetraethylenepentamine, pentaethylenehexamine, and hexaethyleneheptamine is at least 50 wt. % of the polyethylene polyamines of the mixture.

A eighteenth aspect may include any of the previous aspects, wherein the spacer fluid further comprises a mutual solvent in an amount of from 0.1 wt. % to 10 wt. % relative to the total weight of the spacer fluid.

A nineteenth aspect may include any of the previous aspects, wherein the spacer fluid further comprises a surfactant in an amount of from 0.01 wt. % to 5 wt. % relative to the total weight of the spacer fluid.

A twentieth aspect may include any of the previous aspects, wherein the spacer fluid further comprises a defoamer in an amount of from 0.01 wt. % to 5 wt. % relative to the total weight of the spacer fluid.

It should now be understood that various aspects of the present disclosure are described and such aspects may be utilized in conjunction with various other aspects.

It is noted that any two quantitative values assigned to a property may constitute a range of that property, and all combinations of ranges formed from all stated quantitative values of a given property are contemplated in this disclosure.

Having described the subject matter of the present disclosure in detail and by reference to specific aspects, it is noted that the various details of such aspects should not be taken to imply that these details are essential components of the aspects. Rather, the appended claims should be taken as the sole representation of the breadth of the present disclosure and the corresponding scope of the various aspects described in the present disclosure.

What is claimed is:

1. A spacer fluid comprising:
   an aqueous fluid;
   a weighting agent; and
   a clay stabilizer consisting of one or more polyethylene polyamines having a first structure $H_2NCH_2CH_2(NHCH_2CH_2)_xNH_2$, where x is an integer greater than or equal to 3, wherein:
   the one or more polyethylene polyamines comprises hexaethyleneheptamine;
   the amount of the clay stabilizer is from 0.1 wt. % to 10 wt. % relative to the total weight of the spacer fluid;
   the average molecular weight of the polyethylene polyamines in the spacer fluid having the first structure is from 200 g/mol to 400 g/mol; and
   all of the polyethylene polyamines in the spacer fluid having the first structure are encompassed in the clay stabilizer.

2. The spacer fluid of claim 1, wherein the spacer fluid comprises the aqueous fluid in an amount of from 25 wt. % to 50 wt. % relative to the total weight of the spacer fluid.

3. The spacer fluid of claim 1, wherein the spacer fluid comprises the weighting agent in an amount of from 25 wt. % to 75 wt. % relative to the total weight of the spacer fluid.

4. The spacer fluid of claim 1, wherein the polyethylene polyamines comprise linear polyethylene polyamines, cyclic polyethylene polyamines, branched polyethylene polyamines, or combinations of these.

5. The spacer fluid of claim 1, wherein the polyethylene polyamines further comprise tetraethylenepentamine, pentaethylenehexamine, or both.

6. The spacer fluid of claim 5, wherein the sum of the weight percent of the tetraethylenepentamine, pentaethylenehexamine, and hexaethyleneheptamine is at least 50 wt. % of the polyethylene polyamines.

7. The spacer fluid of claim 1, wherein the spacer fluid further comprises a mutual solvent in an amount of from 0.1 wt. % to 10 wt. % relative to the total weight of the spacer fluid.

8. The spacer fluid of claim 1, wherein the spacer fluid further comprises a surfactant in an amount of from 0.01 wt. % to 5 wt. % relative to the total weight of the spacer fluid.

9. The spacer fluid of claim 1, wherein the spacer fluid further comprises a defoamer in an amount of from 0.01 wt. % to 5 wt. % relative to the total weight of the spacer fluid.

10. The method of claim 1, wherein:
the polyethylene polyamines further comprise tetraethylenepentamine and pentaethylenehexamine; and
the sum of the weight percent of the tetraethylenepentamine, pentaethylenehexamine, and hexaethyleneheptamine is at least 90 wt. % of the polyethylene polyamines.

11. A method for cementing a casing in a wellbore, the method comprising displacing at least a portion of a drilling fluid positioned in the wellbore with a spacer fluid comprising:
an aqueous fluid;
a weighting agent; and
a clay stabilizer consisting of one or more polyethylene polyamines having a first structure $H_2NCH_2CH_2(NHCH_2CH_2)_xNH_2$, where x is an integer greater than or equal to 3, wherein:
the one or more polyethylene polyamines comprises hexaethyleneheptamine;
the amount of the clay stabilizer is from 0.1 wt. % to 10 wt. % relative to the total weight of the spacer fluid;
the average molecular weight of the polyethylene polyamines in the spacer fluid having the first structure is from 200 g/mol to 400 g/mol; and
all of the polyethylene polyamines in the spacer fluid having the first structure are encompassed in the clay stabilizer.

12. The method of claim 11, wherein the method further comprises displacing the spacer fluid with a cement slurry.

13. The method of claim 12, wherein:
the spacer fluid is pumped into a first conduit defined by an interior wall of a tubular in the wellbore;
the cement slurry is pumped into the first conduit; and
at least a portion of the drilling fluid exits the well bore through a second conduit defined by an exterior wall of the tubular and a wall of the wellbore.

14. The method of claim 11, wherein the spacer fluid comprises the aqueous fluid in an amount of from 25 wt. % to 50 wt. % relative to the total weight of the spacer fluid.

15. The method of claim 11, wherein the spacer fluid comprises the weighting agent in an amount of from 25 wt. % to 75 wt. % relative to the total weight of the spacer fluid.

16. The method of claim 11, wherein the polyethylene polyamines comprise linear polyethylene polyamines, cyclic polyethylene polyamines, branched polyethylene polyamines, or combinations of these.

17. The method of claim 11, wherein the polyethylene polyamines further comprise tetraethylenepentamine, pentaethylenehexamine, or both.

18. The method of claim 17, wherein the sum of the weight percent of the tetraethylenepentamine, pentaethylenehexamine, and hexaethyleneheptamine is at least 50 wt. % of the polyethylene polyamines.

19. The method of claim 11, wherein the spacer fluid further comprises a mutual solvent in an amount of from 0.1 wt. % to 10 wt. % relative to the total weight of the spacer fluid.

20. The method of claim 11, wherein the spacer fluid further comprises a surfactant in an amount of from 0.01 wt. % to 5 wt. % relative to the total weight of the spacer fluid.

21. The method of claim 11, wherein the spacer fluid further comprises a defoamer in an amount of from 0.01 wt. % to 5 wt. % relative to the total weight of the spacer fluid.

* * * * *